United States Patent [19]

Barrett

[11] Patent Number: 5,005,263
[45] Date of Patent: Apr. 9, 1991

[54] EYEGLASS SUPPORT

[76] Inventor: Robert D. Barrett, 10261 Canterbury St., Westchester, Ill. 60154

[21] Appl. No.: 426,305

[22] Filed: Oct. 24, 1989

[51] Int. Cl.[5] .............................................. A44B 21/00
[52] U.S. Cl. .................................. 24/3 C; 24/600.9; 351/156
[58] Field of Search ..................... 24/236, 237, 241 R, 24/241 PP, 241 S, 231, 241 SB, 232, 233, 234, 235, 3 C; 351/156

[56] References Cited

U.S. PATENT DOCUMENTS

| 314,867 | 3/1885 | Murphy | 24/233 |
| 616,145 | 12/1898 | Rothar | 24/236 |
| 1,180,387 | 4/1916 | Farrand | 24/236 |
| 1,545,377 | 7/1925 | Westmoreland | 24/233 X |
| 2,246,630 | 6/1941 | Johnson | 24/234 X |

FOREIGN PATENT DOCUMENTS 176163 8/1961 Sweden .................... 24/234

Primary Examiner—James R. Brittain
Attorney, Agent, or Firm—Hill, Van Santen, Steadman & Simpson

[57] ABSTRACT

An eyeglass support system including an eyeglass frame having a frame front, a temple at each side of the frame front, a pair of earpieces connected to the temples by hinges, an elongated flexible member for securing the frame to a wearer, and a securing mechanism for attaching a flexible member to the frame. The securing mechanism includes an eyelet secured to the frame, and at least one clip for removably attaching the flexible member to the eyelet. In a preferred embodiment, the clip includes a body portion and a hook portion between which extends a spring bar closure. The spring bar closure is opened and closed by means of a spring bar lever that is pivotally attached to the body portion of the clip. The eyelet itself may be mounted on various portions of the eyeglass hinge.

5 Claims, 1 Drawing Sheet

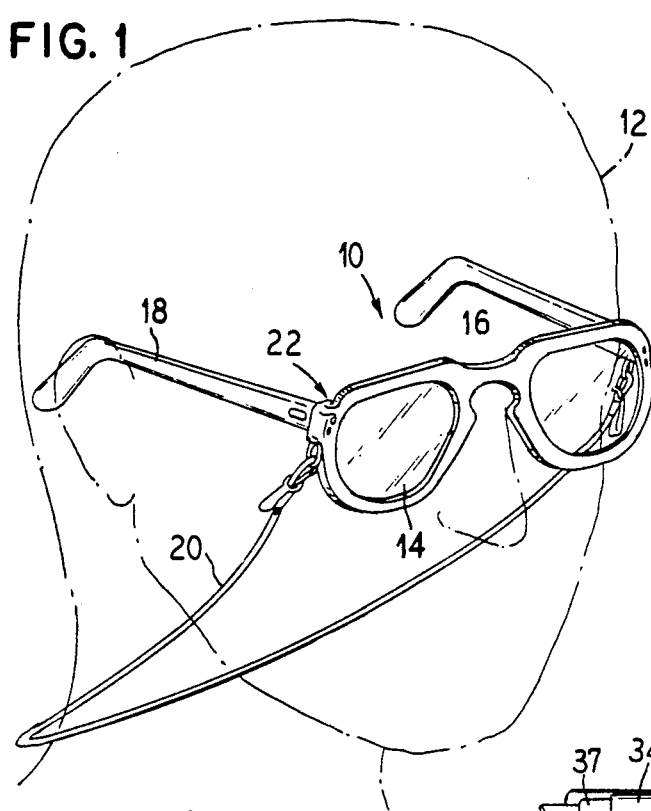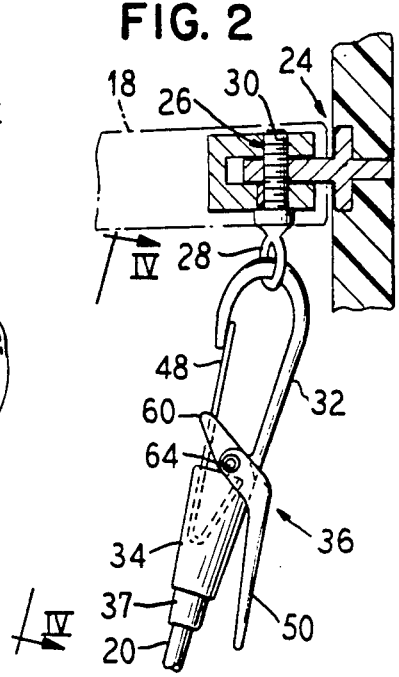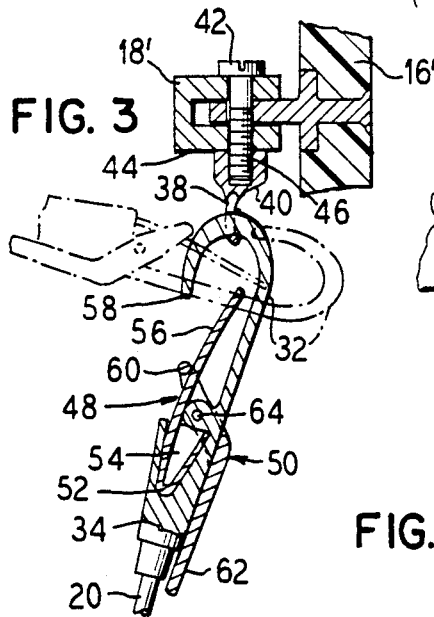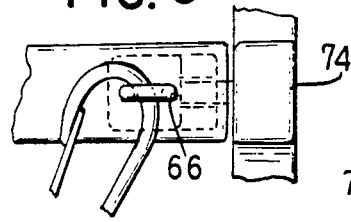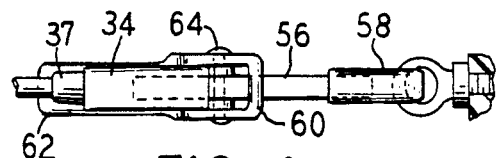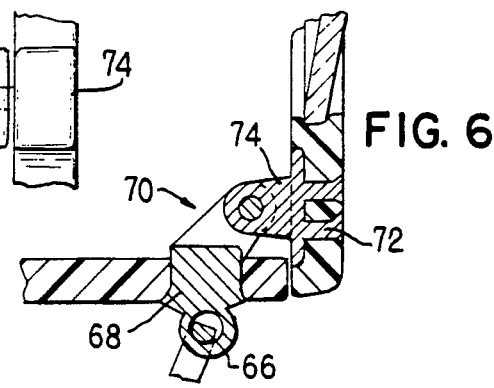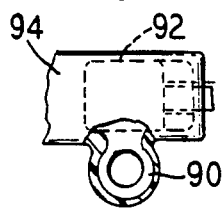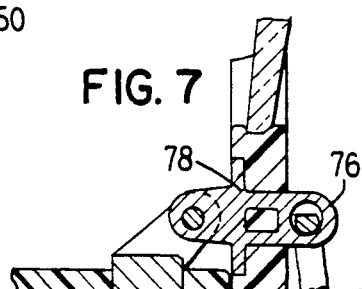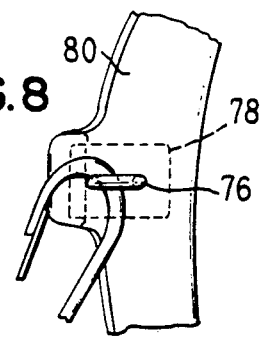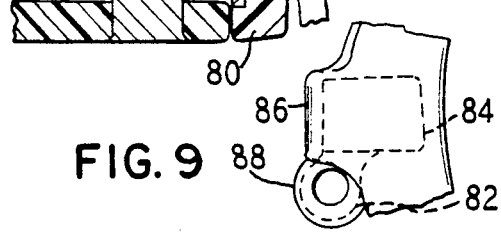

EYEGLASS SUPPORT

TECHNICAL FIELD

The invention relates to systems for permitting eyeglass wearers to retain eyeglasses attached to their persons in use or non-use positions, and more particularly to apparatus for removably securing parts of such systems to on another.

BACKGROUND OF THE INVENTION

The attachment of retaining cords to eyeglasses is well known. One arrangement currently in use includes a length of cord or chain with a closed, elastic loop at each end. The wearer inserts the earpieces of the eyeglass frames respectively through the loops, and then slides the loops toward the temples of the eyeglass frame. The loops are held in place either by their own elasticity, or are provided with a cinch mechanism to be tightened by the wearer. Another known arrangement includes a cord having a length of elastic tubing at each end. The wearer inserts the earpieces into the tubes, which are held in place on the earpieces by virtue of having an internal dimension smaller then that of the earpieces. The wearer then slides the tubes forward on the earpieces until they reach the desired end position.

The above described arrangements rely on elastic members for securing their component parts. After repeated mounting and removal, and/or due simply to aging, such members lose their resiliency, and become unreliable and eventually useless. Furthermore, the cinch mechanisms in known arrangements are small, and require fine yet firm manipulation for actuation. Use of these arrangements by eyeglass wearers with arthritis or other disabilities is thus particularly difficult, if not impossible.

SUMMARY OF THE INVENTION

It is, therefore, an object of the present invention to provide a securing mechanism for an eyeglass support system that is both reliable and easy to use. This and other objects are achieved by providing an eyeglass support system including an eyeglass frame having a frame front, a temple at each side of the frame front, a pair of earpieces connected to the temples via hinges, an elongated flexible member for securing the frame to a wearer, and a securing mechanism for attaching the flexible member to the frame.

The securing mechanism includes an eyelet secured to the frame, and at least one clip for removably attaching the flexible member to the eyelet.

In a preferred embodiment, the clip includes a body portion and a hook portion between which extends a spring bar closure. The spring bar closure is opened and closed by means of a spring bar lever that is pivotably attached to the body portion of the clip.

The eyelet itself may be mounted on various portions of the eyeglass hinge.

Other objects and advantages of the present invention will become apparent upon reference to the accompanying description when taken in conjunction with the following drawings.

BRIEF DESCRIPTION OF THE DRAWINGS

FIG. 1 is a perspective view of an embodiment of the present invention, with a wearer's head shown in phantom line.

FIG. 2 is a side view, partially broken away, showing a clip in detail.

FIG. 3 is a side sectional view similar to that of FIG. 2.

FIG. 4 is a view taken generally along lines IV—IV in FIG. 2.

FIGS. 5 and 6 are side and top views, respectively, showing an alternative eyelet mounting position.

FIGS. 7 and 8 are top and front views, respectively, showing another alternative eyelet mounting position.

FIGS. 9 and 10 are front and side views, respectively, showing plastic-coated eyelets.

DESCRIPTION OF THE PREFERRED EMBODIMENT

In FIG. 1, eyeglasses 10 are shown in position on the head of a wearer 12. The eyeglasses 10 include lenses 14 mounted in a frame 16, which includes a frame front 16 and earpieces 18. An elongated flexible member 20, shown here in the form of a cord, is secured at its respective ends to temples 22 of the frame front 16. Although the flexible member 20 is shown here as a cord, it is to be understood that other similar components, e.g. a chain, could be used in the alternative. The flexible member 20 supports the eyeglasses 10 around the neck of the wearer 12 when the eyeglasses are in a non-use position (not shown), and prevents the eyeglasses 10 from falling to the ground in the event of their being accidentally jarred from their in-use position.

The present invention is shown in greater detail in FIGS. 2-4. A hinge 24 connects the earpiece 18 to the temple 22. The hinge 24 pivots about a hinge pin 26, which includes an eyelet 28 integrally formed with a threaded portion 30. The eyelet 28 is adapted to receive a hook portion 32 extending from a body portion 34 of a clip 36. The flexible member 20 is attached to the clip 36 via a ferrule 37 or similar connector. In FIG. 3, an eyelet 38 is shown as being integrally formed with a threaded cap 40. A hinge pin 42, slightly longer than a standard hinge pin, extends far enough beyond a surface 44 of the earpiece 18' so that the cap 40 may be threaded onto a threaded section 46 of the hinge pin 42.

The clip 36, in addition to the body portion 34 and the hook portion 32, further includes a spring bar closure 48 and a spring bar lever 50. The spring bar closure 48 has a bent end 52 mounted in a recess 54 in the body portion 34, and a free end 56 extending from the body portion 34 to a hook end 58 of the hook portion 32.

The spring bar lever 50 includes a contact arm 60 and a control arm 62, and is pivotably connected to the body portion 34 via a pivot pin 64.

As seen in the Figures, the control arm 62 is provided as a solid bar having a length that is substantially coextensive with the body portion 34. Additionally, the contact arm 60 is shown as a closed loop extending from the control arm 62 and around the spring bar closure 48. (Note particularly FIGS. 2 and 4).

Installation and removal of the clip 36 is as shown in FIG. 3. Before clip 36 can be either installed or removed, the wearer must fold the earpiece 18' against the frame front 16' to expose the opening of the eyelet 38. Next, the wearer presses the control arm 62 towards the body portion 34 of the clip 36, which causes the spring bar lever to pivot about the pivot pin 64, whereby the contact arm 60 forces the free end 56 of the spring bar closure member 48, and thus the clip 36, into an open position. While holding the clip 36 in the open position, the wearer simply inserts (for installation) or withdraws (for removal) the hook end 58 through the eyelet 38 and releases the control arm 62, thus allowing the clip 36 to return to a "closed" position.

FIGS. 5–10 show alternative eyelet mounting positions, in which the present invention further provides for the formation of eyelets integrally with hinge sections. The hinge section subsequently is held in place while the frame front or earpiece is molded there around.

FIGS. 5 and 6 show an eyelet 66 extending laterally outwardly from an earpiece portion 68 of a hinge 70. One or both of the hinge portions may be provided with projections 72, shown here on a temple hinge portion 74, which lend structural strength to the hinge/frame connection.

The views shown in FIGS. 7 and 8 are similar to those of FIGS. 5 and 6, but show an eyelet 76 formed integrally with a temple hinge portion 78. The eyelet 76 extends forward from a frame front 80.

FIG. 9 shows an eyelet 82 formed with a temple hinge portion 84, and extending laterally and downwardly from a temple 86. Additionally, the eyelet 82 is provided with a plastic coating 88 that is molded around the eyelet 82 simultaneously with the molding of the temple 86.

FIG. 10 shows a similarly plastic-coated eyelet 90 extending from an earpiece hinge section 92 around which is molded an earpiece 94.

The plastic coating 88 serves to visually integrate the eyelet into the rest of the frame, and protects the eyelet against damage due to moisture and impact. Such coating, however, is not limited to the embodiments at FIGS. 9 and 10, but is equally applicable to any eyelet configuration.

Although the present invention has been described with reference to a specific embodiment, those of skill in the art will recognize that changes may be made thereto without departing from the scope and spirit of the invention as set forth in the appended claims.

I claim as my invention:

1. A selectively actuable clip of the type including a body portion, a stationary portion extending from said body portion, and a selectively movable, resilient closure member between said body portion and said engaging portion, said clip further including a lever means pivotally attached to said body portion and comprising the following:
    contact arm means for selective engagement with said closure member;
    control arm means, rigidly attached to, and disposed at a predetermined angle to, said contact arm means, for engagement by a user to move said closure means; and
    pivot pin means, disposed between said contact arm means and said control arm means, for pivotably attaching said lever means to said body portion.

2. A clip according to claim 1, further wherein said closure member comprises the following:
    a bent end rigidly secured to said body portion; and
    a free end extending from said body portion to said engaging portion.

3. A clip according to claim 2, further wherein said bent end of said closure member is mounted in a recess in said body portion.

4. A clip according to claim 3, further wherein:
    said stationary engaging portion comprises a hook having a hook end; and
    said free end of said closure member abuts said hook end when said closure member is in a closed position.

5. A clip according to claim 4, further wherein:
    said control arm means comprises solid bar having a length that is substantially co-extensive with said body portion; and
    said contact arm means comprises a closed loop extending from said control arm means and around said closure member.

* * * * *